United States Patent [19]

Van Dest

[11] 4,282,775
[45] Aug. 11, 1981

[54] TRANSMISSION HAVING A TWO-SPEED PLANETARY GEAR SET

[75] Inventor: Jean-Claude Van Dest, Ris-Orangis, France

[73] Assignee: Massey-Ferguson Inc., Detroit, Mich.

[21] Appl. No.: 40,379

[22] Filed: May 18, 1979

[30] Foreign Application Priority Data

May 30, 1978 [GB] United Kingdom ............... 23948/78

[51] Int. Cl.³ .................. F16H 37/00; F16H 3/08
[52] U.S. Cl. .................... 74/740; 74/781 R; 74/360
[58] Field of Search ............ 74/766, 767, 363, 369, 74/370, 356, 358, 359, 361, 377, 750 R, 740, 759, 762, 763, 781, 674, 360

[56] References Cited

U.S. PATENT DOCUMENTS

| | | | |
|---|---|---|---|
| 2,344,046 | 3/1944 | Tourneau | 74/377 X |
| 2,464,538 | 3/1949 | Vanderzee | 74/377 |
| 2,534,506 | 12/1950 | Essick | 74/377 |
| 2,547,732 | 4/1951 | Baker | 74/377 X |
| 2,576,156 | 11/1951 | Trofimov | 74/377 |
| 2,757,557 | 8/1956 | Hoffman | 74/740 |
| 2,872,003 | 2/1959 | Nussbaumer | 74/377 X |
| 3,181,393 | 5/1965 | Jandasek | 74/781 R |
| 3,382,735 | 5/1968 | Gatiss | 74/377 X |
| 3,799,003 | 3/1974 | Van Dest | 74/767 X |
| 4,008,629 | 2/1977 | Hoepfl et al. | 74/781 R |
| 4,114,478 | 9/1978 | Clauss | 74/781 R |
| 4,178,814 | 12/1979 | Ahlen | 74/781 R |

FOREIGN PATENT DOCUMENTS

| | | | |
|---|---|---|---|
| 1249910 | 10/1959 | France | 74/377 |
| 700382 | 12/1953 | United Kingdom | 74/377 |

Primary Examiner—C. J. Husar
Assistant Examiner—Philip W. Thor
Attorney, Agent, or Firm—John C. Thompson

[57] ABSTRACT

A two-speed planetary change gear mechanism 28 is added to a basic eight-speed change gear mechanism to provide a 16-speed transmission, the planetary transmission 28 including a manually operated forward/reverse gear mechanism. The two-speed mechanism is mounted within the housing 16 of the eight-speed mechanism. The forward/reverse mechanism includes a shift coupler 84 engageable with gears 80, 82 mounted about a shaft 78 which is coaxial with the upper shaft 30 of the eight-speed mechanism. The input gear 86 which is driven by the forward/reverse gears 80, 82 is mounted on the second shaft 38. The two-speed planetary gear set 96 is coupled on its input side to input shaft 98 and on its output side to shaft 78.

5 Claims, 6 Drawing Figures

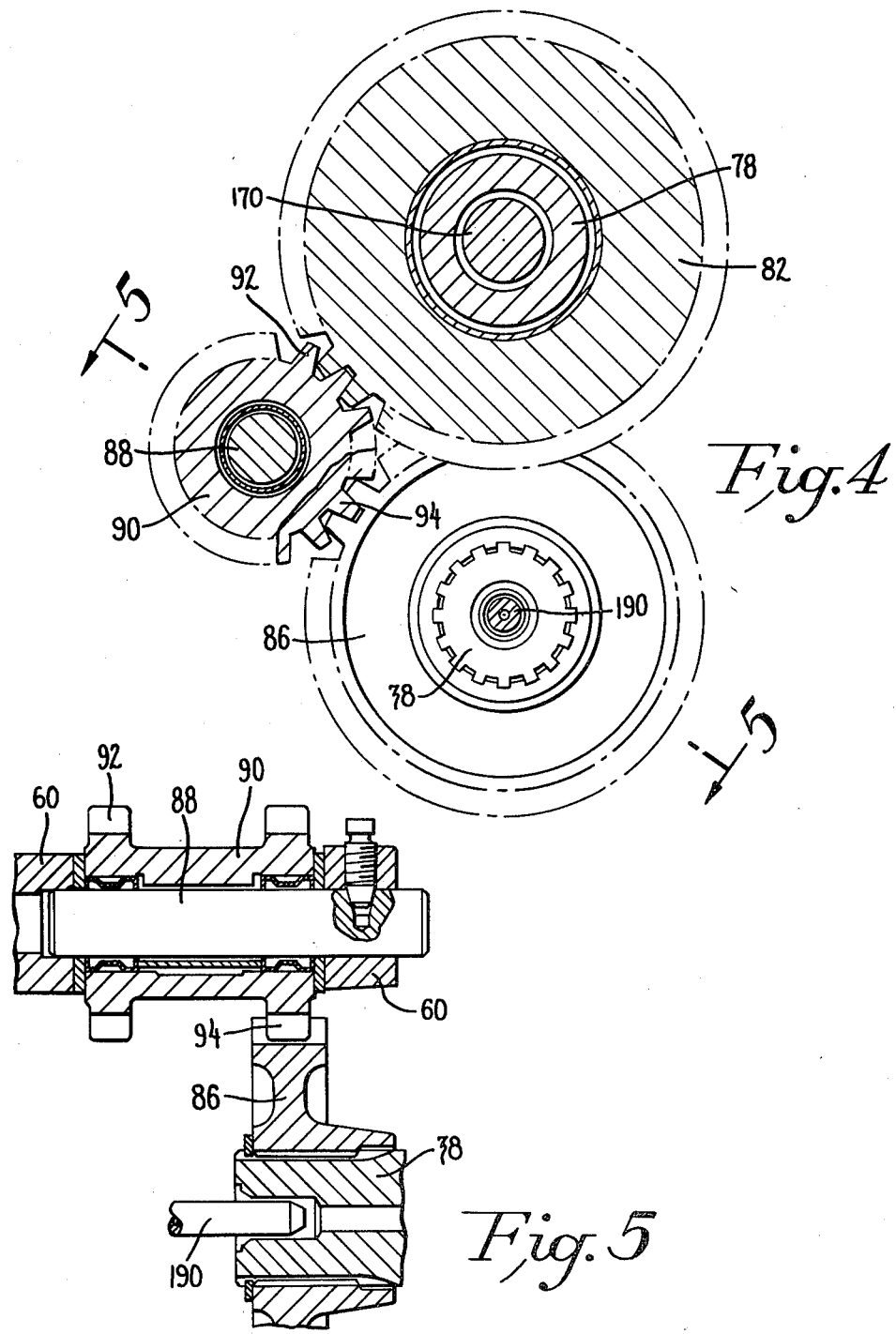

TRANSMISSION HAVING A TWO-SPEED PLANETARY GEAR SET

TECHNICAL FIELD

The present invention relates generally to multiple speed ratio transmissions, and more particularly to a transmission of the type having a first change gear mechanism including a forward/reverse gear mechanism and a 2-speed planetary gear change mechanism.

BACKGROUND ART

The present invention relates to an improvement in my prior U.S. Pat. Nos. 3,757,598 and 3,799,003. In the first of the aforementioned patents an 8-speed change gear mechanism is illustrated including a forward/reverse change gear mechanism disposed on the input side of the change gear mechanism. The second of the aforementioned patents discloses a planetary mechanism that may be used in conjunction with the basic 8-speed change gear mechanism, the planetary mechanism being of a type capable of providing either a 3-speed input or, alternatively, a hydraulically operated forward/reverse input section.

DISCLOSURE OF INVENTION

In accordance with the principles of the present invention a second change gear mechanism is provided for a transmission having a first change gear mechanism which includes first and second shafts carrying a plurality of intermeshing gear sets, the second change gear mechanism being removably supported within the housing and including a rotatable third shaft, a forward/reverse gear mechanism including a pair of gears journaled about and selectively engageable with the third shaft, and a 2-speed planetary gear set in driving relationship with the third shaft.

BRIEF DESCRIPTION OF DRAWINGS

FIG. 4 is a section taken generally along the line 4—4 in FIG. 3.

FIG. 5 is a section taken generally along the line 5—5 in FIG. 4.

DETAILED DESCRIPTION

Figure 1:
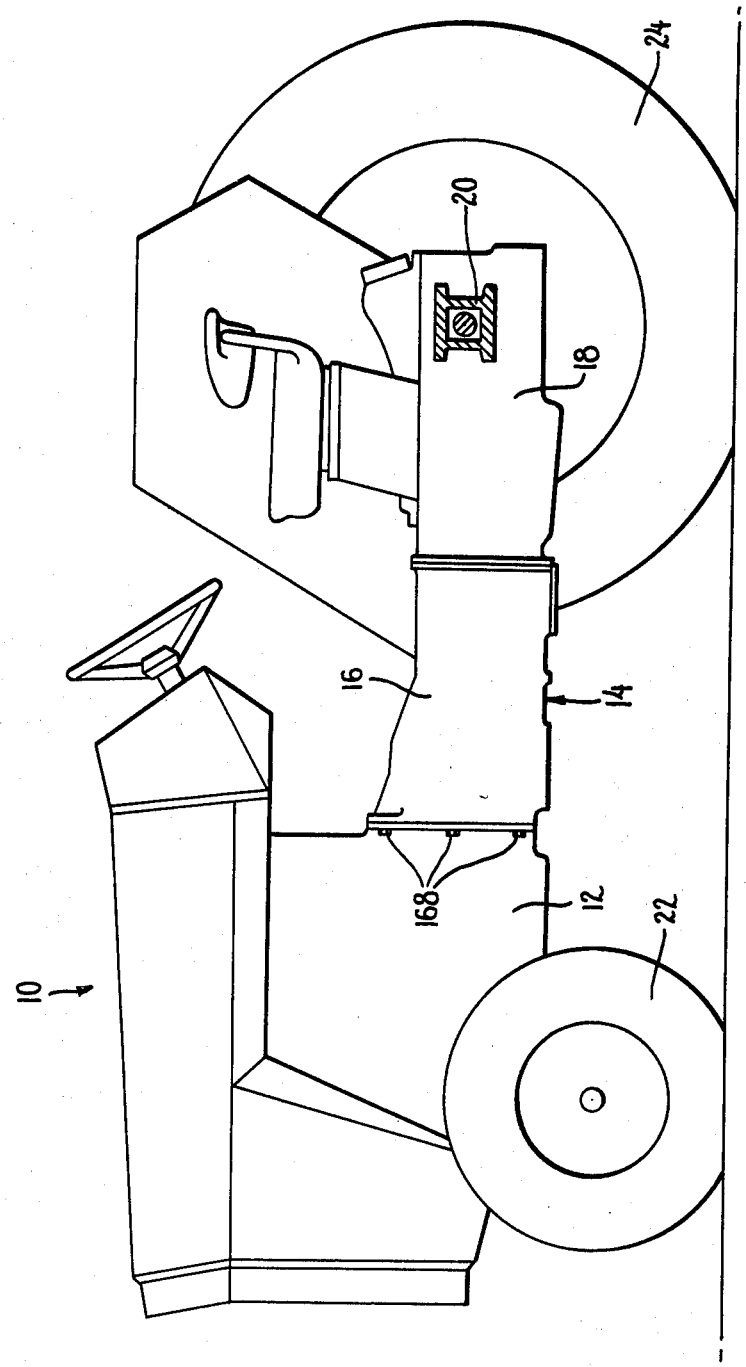
FIG. 1 is a side view of a frameless tractor in which the principles of the present invention are incorporated.

Referring first to FIG. 1, a frameless tractor is illustrated, the tractor being indicated generally at 10 and including an engine 12, a transmission indicated generally at 14, the transmission including a housing 16, a rear or center housing 18, and an axle housing 20. Front and rear wheels 22,24 are mounted on the tractor in a conventional manner. As can be seen from FIG. 1 the engine 12, transmission housing 16 and center housing 20 form structural support members for the tractor and therefore this type of tractor is generally referred to as a frameless tractor.

Figure 2:
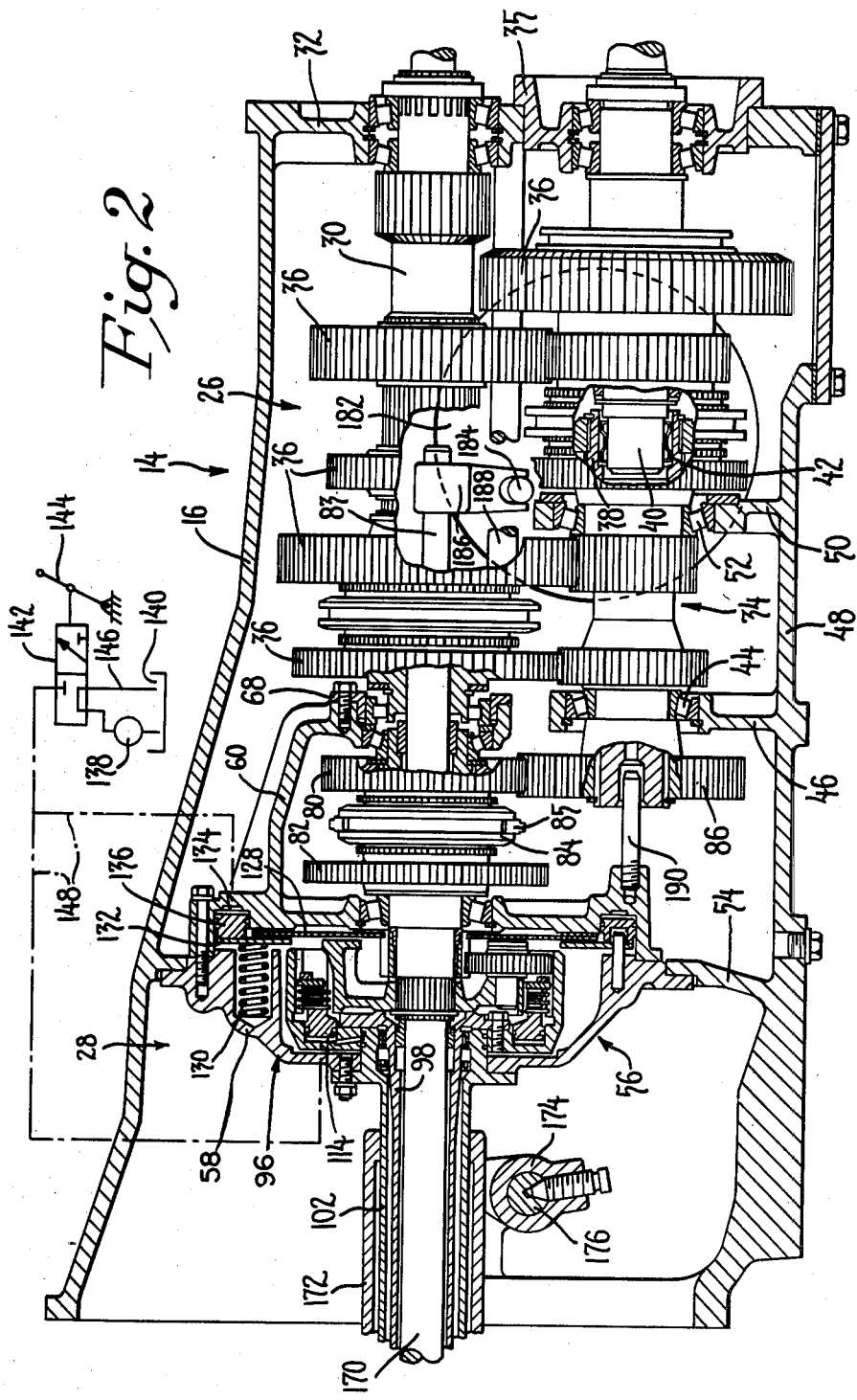
FIG. 2 is a sectional view of one transmission option.
Figure 6:
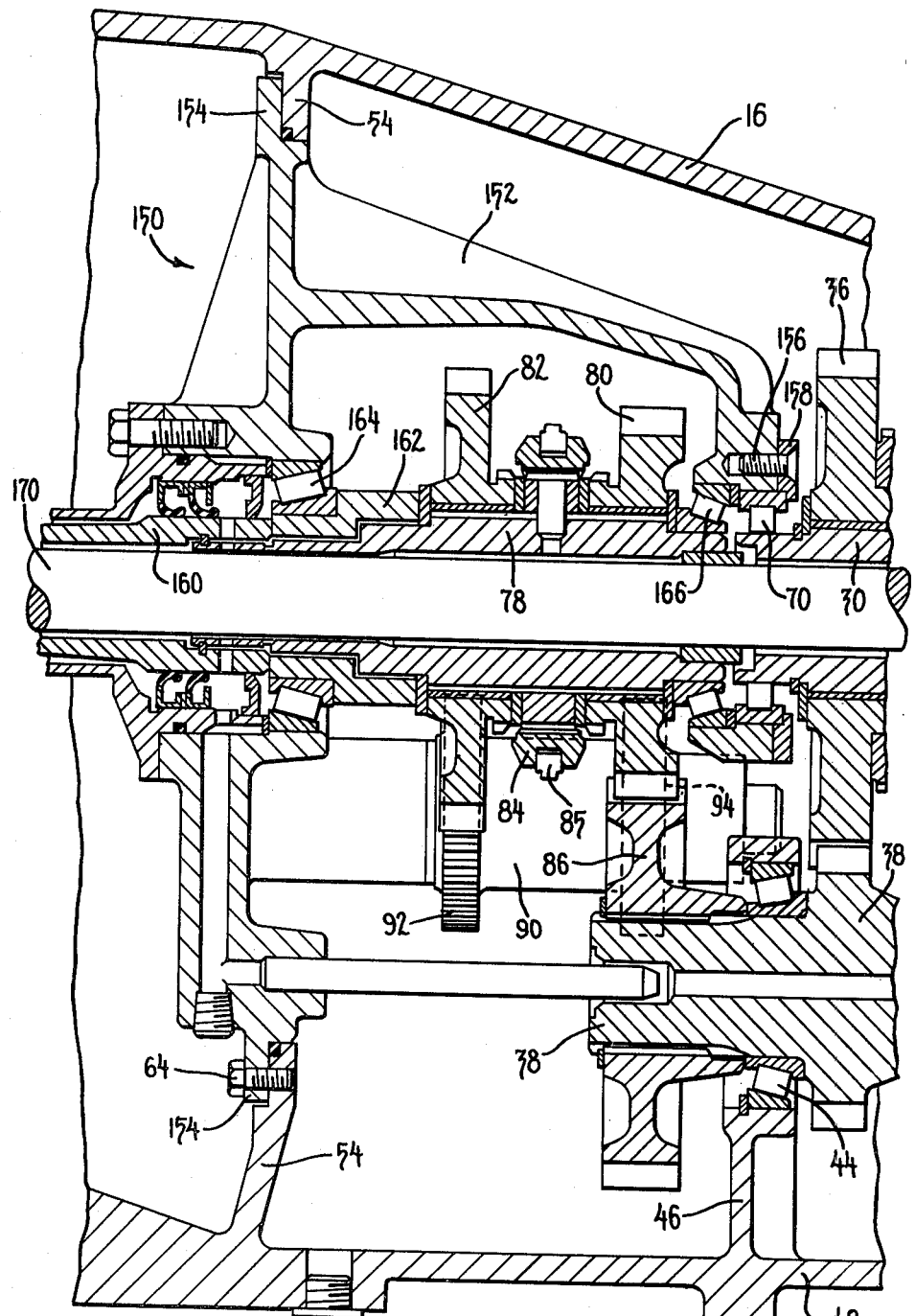
FIG. 6 is a view similar to FIG. 3 showing a second transmission option.

In accordance with the principles of this invention first and second change gear mechanisms, indicated generally at 26 and 28, (FIG. 2) are coupled to each other within the transmission housing. The first change gear mechanism as illustrated is of a type giving eight differing speed ratios between the input side and the output shaft. The second change gear mechanism is of a type including a forward/reverse mechanism, and it may include additional speed ratios. Thus, in the embodiment illustrated in FIG. 2 the second change gear mechanism includes a forward/reverse mechanism as well as mechanism for providing two additional speed ratios to the input of the first change gear mechanism 26, thereby providing a transmission having 16 speeds. Differing second change gear mechanisms may be employed and a second version is illustrated in FIG. 6. In order to provide for the substitution of one change gear mechanism for another it has been necessary to design the first and second change gear mechanisms and the housing in a special manner.

To this end the first change gear mechanism 26 is provided with a first hollow shaft 30 and a second two piece shaft 34, the rear end of the first shaft 30 being rotatably journaled in the rear end wall 32 of the housing 16, and the rear end of the second shaft assembly 34 being rotatably journaled in a bearing plate 35 which is in turn carried by the rear wall 32. A plurality of intermeshing gear sets 36 are carried by the first and second shafts 30,34 and are selectively interconnectable to transmit power from one shaft to the other. One manner in which the gears 36 may be mounted on the shafts 30,34 is illustrated in my earlier U.S. Pat. No. 3,757,598. The second shaft assembly 34 is divided into forward and rear portions 38,40, respectively, the forward end of the rear portion 40 being journaled by bearings 42 carried within a cylindrical recess on the rear end of the forward portion 38. The forward portion 38 may be referred to as a counter shaft, and the rear portion 40 as an output shaft. The output shaft 40 is coupled to a driven member (not shown). The forward end of the counter shaft 38 is carried by a bearing 44 which is in turn supported by a first flange 46 which extends inwardly from the generally cylindrical side walls 48 of the housing 16. An additional flange 50 is provided between the first flange 46 and the rear wall 32, the additional flange 50 carrying a further bearing 52 which rotatably supports a rear portion of the counter shaft 38.

Figure 3:
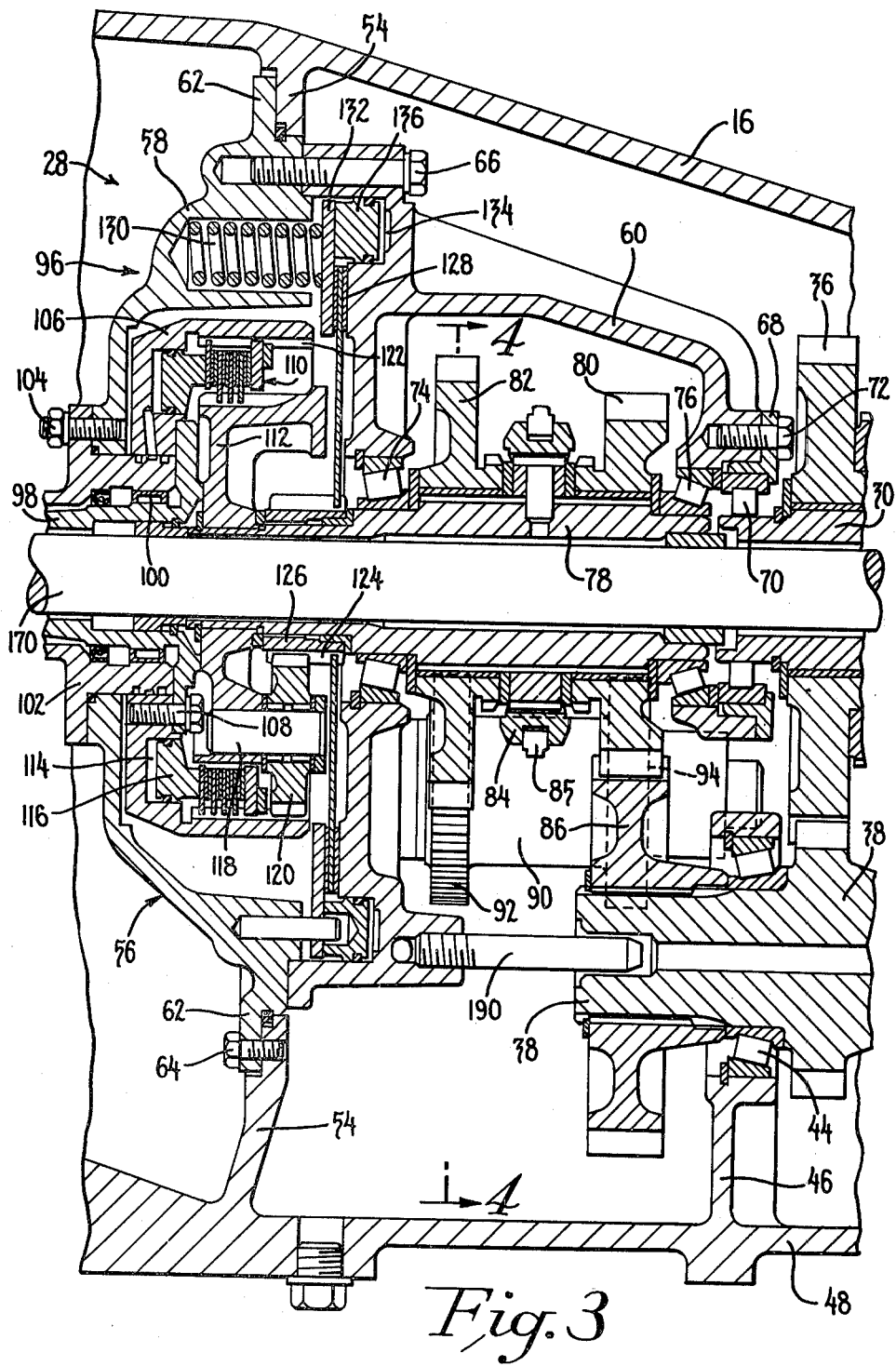
FIG. 3 is an enlarged view of a portion of the transmission shown in FIG. 2.

In order to removably mount a second change gear mechanism within the housing, the housing 16 is provided with an inwardly extending annular flange 54. A support member indicated generally at 56 is removably secured to the second flange 54. In the embodiment illustrated in FIGS. 2 and 3 the support member 56 is formed of two parts which shall be referred to as the front cover 58 and the support frame 60. The front cover 58 is provided with a radially outwardly extending circular flange 62 which is secured to the annular flange 54 by bolts 64 or the like. The support frame 60 has a radius less than that of the annular support flange 54 and is secured to the front cover 58 by cap screws 66. The front cover and support frame 58,60 cooperate with the rear wall 32 to form a fluid reservoir within the housing 16. In addition, the support frame 60, which is rigidly mounted within the housing, is utilized to support the forward end of the main shaft 30. To this end, a bearing support 68 which carries a bearing 70 is secured in place by bolts 72. The forward end of the first shaft 30 is journaled within the bearing 70.

The support frame 60 carries additional bearings 74 and 76 in which is journaled a hollow third shaft 78. Rotatably mounted on the third shaft are spaced apart forward and reverse gears 80,82. A shiftable coupler 84 is keyed to the shaft 78 and may be shifted axially of the shaft to drivingly interconnect either the forward gear 80 with the shaft 78 or the reverse gear 82 with the shaft 78. The coupler is caused to be shifted by a shift rail 83 and fork 85. The shift rail is carried by the support member 56 for axial sliding movement. The gear 80 is at all times in constant mesh with a gear 86 carried by the forward end of the counter shaft 38. The support member 56 additionally carries a stub shaft 88 (FIGS. 4 and 5) upon which is mounted a reverse idler 90 having a first toothed portion 92 which is constantly in mesh with the teeth on gear 82, and a second toothed portion 94 which is constantly in mesh with the teeth on gear 86.

Mounted forwardly of the forward/reverse gear mechanism is a 2-speed planetary gear set indicated generally at 96, which gear set along with the forward-/reverse mechanism completes the second change gear mechanism 26. The planetary gear set includes a hollow input shaft 98 the forward end of which is coupled to a drive member such as a tractor clutch plate (not shown). The rear end of the input shaft 98 is supported by a bearing 100 disposed within an aperture of the clutch release bearing carrier 102 which is in turn secured to the front cover 58 by fasteners 104. A ring gear 106 is secured to the input shaft 98 by bolts 108. A hydraulically operated clutch pack 110 may be utilized to couple the ring gear 106 to a planet carrier 112. Thus, when fluid is introduced into the chamber 114 behind the piston 116, the clutch pack 110 will be engaged thereby locking the planet carrier 112 to the ring gear 106. The planet carrier is provided with a plurality of axially extending stub shafts 118 on which are mounted planet gears 120. The teeth 122 on the ring gear 106 and the teeth 124 on a sun gear 126 are in constant mesh with the teeth on the planet gears 120. The planet carrier 112 is coupled directly to the third shaft 78 upon which the forward/reverse gear mechanism is mounted, and the sun gear 126 is journaled for rotation about the shaft 78. A brake disc 128 is secured to the sun gear, which brake disc may be utilized to hold the sun gear from rotation. To this end compression springs 130 are disposed in suitable recesses in the front cover 58, the springs 130 acting against a pressure plate 132 to normally bias the brake disc 128 into engagement with a flat surface on the support frame 60. The brake disc 128 may be disengaged by introducing fluid under pressure into chamber 134 to cause piston 136 to engage the pressure plate 132 and move the plate 132 away from the brake disc 128 and flat surface. The fluid circuit for operating the planetary gear set 96 is illustrated somewhat schematically in FIG. 2 and includes a pump 138, fluid reservoir 140, valve 142, and manual control lever 144. When the valve is in the position illustrated in FIG. 2 fluid from the pump 138 will be returned directly to the reservoir through line 146. In this position the springs 130 will hold the brake disc 128 against the flat surface of the housing 60. When the manual control lever 144 is shifted to its other position (not illustrated) fluid from the pump 138 will be introduced into line 148 and thence into chambers 114 and 134 to cause the piston 136 to disengage the pressure plate 132 and piston 116 to engage the hydraulically operated clutch pack 110. The preload of springs 130 is so designed that when fluid is introduced into the chambers 134 and 114 the hydraulically operated clutch pack 110 will be partially engaged prior to the full disengagement of the brake 128. In the event that the brake 128 became disengaged before the clutch 110 became engaged it would be possible for power flow to be interrupted from the shaft 98 to the shaft 78. By employing springs 130 having a certain preload characteristic it is possible to insure continuous power flow as the planetary gear set is being shifted from its high speed ratio when brake 128 is engaged to its low speed ratio when clutch pack 110 is engaged, and vice versa.

In the embodiment shown in FIGS. 2 through 5 the transmission 14 has 16-speed ratios. In the embodiment illustrated in FIG. 6, which will now be described, the b 2-speed planetary input portion of the second change gear mechanism is eliminated and therefore the transmission 14 is capable of only eight forward speeds. Before describing FIG. 6 in detail it should be observed that some of the components of the second change gear mechanism illustrated in FIG. 6 and indicated generally at 150 are identical to components illustrated in FIGS. 2 through 5, and these components will be indicated by the same reference numerals. In addition, while a first change gear mechanism is illustrated having 8-speeds, other first change gear mechanisms could be employed having a differing number of speeds, such as 4, 6, etc.

The second change gear mechanism 150 of the type illustrated in FIG. 6 includes a combined front cover and support frame 152 provided with an annular flange 154 which may be secured to the annular second flange 54 of the transmission housing 16 by bolts 64. A bearing 70 is carried by a rear portion of the support 152 and is secured in place by screws 156 and a bearing retainer 158. The forward end of the main shaft 30 is journaled within the bearing 70. An input shaft 160, whose forward end is coupled to a drive member such as a tractor clutch, has its rear end coupled directly to the third shaft 78. The forward end of the hollow third shaft 78 is supported by a spacer 162 which is in turn supported by bearing 164 carried by the support frame 152. The rear end of the shaft 78 is also supported by a bearing 166 carried by the support frame 152. A forward/reverse mechanism including forward and reverse gears 80,82 and coupler 84 are mounted about the shaft 78, the gear 80 being in constant mesh with gear 86 on the forward end of counter shaft 38 and the gear 82 being in constant mesh with a reverse idler 90. A fork 85 engages the coupler 84 and is shifted by a shift rail (not shown) which is carried by the support frame 152.

By designing the transmission in the manner indicated above it is possible to utilize the same basic or first change gear mechanism 26 with a variety of second change gear mechanisms which may provide, for example, only a forward/reverse gear mechanism of the type illustrated at 150 in FIG. 6, a 2-speed forward/reverse mechanism of the type illustrated at 28 in FIGS. 2 through 5, or by other input mechanisms such as, for example, a 3-speed forward/reverse mechanism of the type illustrated in U.K. Pat. No. 1,399,373. The manner of converting a tractor from the 16-speed transmission of the type illustrated in FIG. 2 to the 8-speed transmission of the type illustrated in FIG. 6 will now be described.

It is first necessary to separate the transmission housing 16 from the engine 12 and to move these parts apart. To this end, it would be necessary to disconnect all lines, controls, etc. which extend between the engine 12 and housing 16. After this has been done bolts 168 (FIG. 1) which secure the housing 16 to the engine must be removed to permit the front and rear halves of the tractor to be moved apart. The power takeoff shaft 170 which extends through the hollow shafts 98,78 and 30 is then removed. (The front end of the PTO shaft is connected to the engine flywheel by a spline.) After this has been done it is necessary to remove various lubrications lines (not illustrated) and to then remove the clutch release bearing carrier 102, the saddle assembly 172, the clutch release lever 174, and the clutch cross shaft 176. As the shift rail 83 and fork 85 for the forward/reverse mechanism are carried by the front member 56 it is necessary that the shift cover 182 be removed from the right side of the transmission housing in order to disengage the reverse actuator 184 from the forward reverse saddle 186 carried at the rear end of the shift rail 83. While the mechanism for operating the reverse actuator 184 is not illustrated it should be observed that the reverse actuator 184 may be carried at one end of a rock arm, the other end of which is connected to a rock shaft which may be rotatably mounted in the shift cover 182. The shift column and controls for the other shift rails 188, as well as the mechanism for operating the reverse actuator 184, may be of the type illustrated in U.S. Pat. No. 3,975,970. When the assembly 28 is being removed it is essential that it be pulled out axially approximately two inches to cause the front ends of shift rails 188 and the rear end of the lubrication tube 190 to be disconnected from their associated recesses. The assembly is now rotated counter-clockwise approximately ⅛ of a turn and is then pulled from the transmission housing 16. To install the assembly 150 in the housing 16 the procedure outlined above is followed in reverse order.

We claim:

1. In a transmission (14) having
   a first change gear mechanism (26) including first and second parallel shafts (30, 34) carrying a plurality of intermeshing gear sets (36) and an input gear (86); and
   a housing (16) for the first change gear mechanism (26);
   the improvement comprising a support (60) removably supported within the housing (16), a second change gear mechanism (28) carried by said support (60), the second change gear mechanism (28) including a rotatable third shaft (78), a forward/reverse gear mechanism including a pair of gears (80, 82) rotatably journaled about the third shaft (78) and capable of selectively interconnecting the rotatable third shaft (78) with the input gear (86) to drive the same, and a two-speed planetary gear set (96) in driving relationship with the third shaft (78).

2. The transmission as set forth in claim 1 wherein the two-speed planetary gear set (96) includes a planet carrier (112) in driving relationship with the third shaft (78), said carrier (112) having planet pinions (120) rotatably journaled thereon, a driving ring gear (106), and a sun gear (126) journaled for rotation about said rotatable third shaft (78), braking means (128) for locking the sun gear (126) from rotation relative to said housing (16), clutching means (110) for locking the planet carrier (112) to the driving ring gear (106), and hydraulic operating means (116, 136–148) capable of permitting either the braking means (128) or the clutching means (110) to be applied.

3. The transmission as set forth in claim 1 wherein the support for the second change gear mechanism also supports one end of the first shaft of the first change gear mechanism.

4. The transmission as set forth in claim 3 wherein the third shaft is supported in coaxially alignment with the first shaft.

5. The transmission as claimed in claim 2 wherein the hydraulic operating means includes two hydraulic actuators, one capable of engaging the second clutch means when pressurized, and the other capable of causing the first clutching means to become disengaged when pressurized, a source of fluid under pressure, a valve capable of simultaneously interconnecting both of the hydraulic actuators with the source of fluid under pressure, and wherein the two speed planetary gear set further includes preloaded spring means capable of causing the first clutching means to lock the sun gear from rotation when the associated hydraulic actuator is not pressurized and further being capable of maintaining engagement of the first clutching means when the valve is caused to interconnect both of the hydraulic actuators with the source of fluid under pressure at least until the second clutching means is partially engaged.

* * * * *